United States Patent
Yang et al.

(10) Patent No.: US 11,360,362 B2
(45) Date of Patent: Jun. 14, 2022

(54) DISPLAY PANEL AND DISPLAY DEVICE

(71) Applicants: WUHAN BOE OPTOELECTRONICS TECHNOLOGY CO., LTD., Hubei (CN); BOE TECHNOLOGY GROUP CO., LTD., Beijing (CN)

(72) Inventors: Xiaoguang Yang, Beijing (CN); Yuanhui Guo, Beijing (CN); Yujie Gao, Beijing (CN); Lei Guo, Beijing (CN)

(73) Assignees: WUHAN BOE OPTOELECTRONICS TECHNOLOGY CO., LTD., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 16/934,204

(22) Filed: Jul. 21, 2020

(65) Prior Publication Data
US 2021/0055614 A1 Feb. 25, 2021

(30) Foreign Application Priority Data
Aug. 23, 2019 (CN) .......................... 201910783896.8

(51) Int. Cl.
*G02F 1/1362* (2006.01)

(52) U.S. Cl.
CPC .. *G02F 1/136286* (2013.01); *G02F 1/136209* (2013.01); *G02F 2202/28* (2013.01)

(58) Field of Classification Search
CPC ......... G02F 1/136286; G02F 1/136209; G02F 2202/28; G02F 1/133512; G02F 1/1347
See application file for complete search history.

(56) References Cited

U.S. PATENT DOCUMENTS

2019/0258101 A1* 8/2019 Yasui ..................... G02F 1/1347
2020/0050063 A1* 2/2020 Yoshida ............ G02F 1/134336

* cited by examiner

*Primary Examiner* — Nathanael R Briggs
(74) *Attorney, Agent, or Firm* — Dinsmore & Shohl LLP

(57) ABSTRACT

The present disclosure relates to a display panel and a display device. The display panel includes: a liquid crystal display panel; and a dimming liquid crystal panel including a plurality of dimming pixels defined by a second mesh structure and arranged in an array, wherein the second mesh structure includes a plurality of light shielding lines extending along a first direction and having a waveform, each of the light shielding lines includes a plurality of periodic parts, each of the plurality of periodic parts includes a first portion and a second portion which are symmetrical relative to a symmetry axis along a second direction, the first portion comprises a first segment and a second segment, the second portion comprises a third segment which is symmetrical with the second segment relative to the symmetry axis and a fourth segment which is symmetrical with the first segment relative to the symmetry axis.

18 Claims, 4 Drawing Sheets

DISPLAY PANEL AND DISPLAY DEVICE

CROSS-REFERENCE TO RELATED APPLICATIONS

The present application is based on and claims priority from CN application No. 201910783896.8, filed on Aug. 23, 2019, the disclosure of which is incorporated herein as a whole.

TECHNICAL FIELD

The present disclosure relates to the field of display technologies, and in particular, to a display panel and a display device.

BACKGROUND

Among flat panel display devices, liquid crystal display devices dominate the product market due to their small size, low power consumption, relatively low manufacturing cost and no radiation, and the like. How to improve the display quality of the liquid crystal display device to bring better viewing experience to users is always a key research direction for those skilled in the art.

SUMMARY

According to a first aspect of embodiments of the present disclosure, there is provided a display panel, comprising: a liquid crystal display panel comprising a plurality of subpixels defined by a first mesh structure and arranged in an array; and a dimming liquid crystal panel disposed on a light incident side of the liquid crystal display panel and stacked with the liquid crystal display panel, wherein the dimming liquid crystal panel comprises a plurality of dimming pixels defined by a second mesh structure and arranged in an array, wherein the second mesh structure comprises a plurality of light shielding lines extending along a first direction and having a waveform, each light shielding line of the plurality of light shielding lines comprises a plurality of periodic parts, each periodic part of the plurality of periodic parts comprises a first portion and a second portion which are symmetrical relative to a symmetry axis along a second direction perpendicular to the first direction, the first portion comprises a first segment and a second segment which are connected with adjacent waveform valley points and waveform peak points of the light shielding line, and one end of the first segment and one end of the second segment are located at the same valley point or peak point, a projection length of the first segment and a projection length of the second segment in the first direction are different, and the second portion comprises a third segment which is symmetrical with the second segment relative to the symmetry axis and a fourth segment which is symmetrical with the first segment relative to the symmetry axis.

In some embodiments, the waveform includes a curvilinear waveform or a broken line waveform.

In some embodiments, the waveform is a broken line waveform; and the first segment is a straight line segment or an arc line segment, and the second segment is a straight line segment or an arc line segment.

In some embodiments, a waveform of a first portion in each periodic part of a first light shielding line is the same as a waveform of a second portion in each periodic part of an adjacent second light shielding line; and a waveform of a second portion in each periodic part of the first light shielding line is the same as a waveform of a first portion in each periodic part of the second light shielding line.

In some embodiments, ends of the first segment, ends of the second segment, ends of the third segment, and ends of the fourth segment are overlapped with the first mesh structure in the direction perpendicular to the liquid crystal display panel; or intersections of the ends of the first segment, the ends of the second segment, the ends of the third segment, and the ends of the fourth segment with the first mesh structure overlap in a direction perpendicular to the liquid crystal display panel.

In some embodiments, each row of the subpixels comprises a plurality of pixel units, each of the plurality of pixel units comprises first subpixels, second subpixels and third subpixels that are different in color and arranged in sequence, and the color of the subpixels disposed in the same column is the same; and an area of the dimming pixel is not less than an area of the pixel unit.

In some embodiments, the area of the dimming pixel is approximately 4 times of the area of the pixel unit; an orthographic projection of the first segment on the liquid crystal display panel substantially coincide with a diagonal line of a region where 4×2 subpixels are located, and an orthographic projection of the second segment on the liquid crystal display panel substantially coincide with a diagonal line of an region where 2×2 subpixels are located.

In some embodiments, the first mesh structure comprises a plurality of first gate lines extending along the first direction, a plurality of first data lines extending along the second direction, and a light shielding matrix disposed on one side of the first gate lines and the first data lines away from the dimming liquid crystal panel, a line width of the first gate line and a line width of the first data line are less than a line width of the light shielding matrix, and the first gate line and the first data line are overlapped with the light shielding matrix in the direction perpendicular to the liquid crystal display panel.

In some embodiments, the second mesh structure comprises a plurality of second gate lines extending along a first direction and a plurality of second data lines extending along a second direction, the second gate line and the second data line are disposed on one side of the light shielding lines away from the liquid crystal display panel, and a line width of the second gate line is less than that a line width of the light shielding line, and the second gate line and the light shielding line are overlapped in the direction perpendicular to the liquid crystal display panel.

In some embodiments, the second data line extends in a broken line waveform.

In some embodiments, the dimming liquid crystal panel and the liquid crystal display panel are bonded by an optically clear adhesive; or the dimming liquid crystal panel and the liquid crystal display panel share the same manufacturing substrate on one side close to each other.

According to a second aspect of the embodiments of the present disclosure, there is provided a display device comprising a display panel, the display panel comprising: a liquid crystal display panel comprising a plurality of subpixels defined by a first mesh structure and arranged in an array; and a dimming liquid crystal panel disposed on a light incident side of the liquid crystal display panel and stacked with the liquid crystal display panel, wherein the dimming liquid crystal panel comprises a plurality of dimming pixels defined by a second mesh structure and arranged in an array, wherein the second mesh structure comprises a plurality of light shielding lines extending along a first direction and having a waveform, each light shielding line of the plurality of light shielding lines comprises a plurality of periodic parts, each periodic part of the plurality of periodic parts comprises a first portion and a second portion which are symmetrical relative to a symmetry axis along a second direction perpendicular to the first direction, the first portion comprises a first segment and a second segment which are connected with adjacent waveform valley points and waveform peak points of the light shielding line, and one end of the first segment and one end of the second segment are located at the same valley point or peak point, a projection length of the first segment and a projection length of the second segment in the first direction are different, and the second portion comprises a third segment which is symmetrical with the second segment relative to the symmetry axis and a fourth segment which is symmetrical with the first segment relative to the symmetry axis.

In some embodiments, the waveform includes a curvilinear waveform or a broken line waveform.

In some embodiments, the waveform is a broken line waveform; and the first segment is a straight line segment or an arc line segment, and the second segment is a straight line segment or an arc line segment.

In some embodiments, a waveform of a first portion in each periodic part of a first light shielding line is the same as a waveform of a second portion in each periodic part of an adjacent second light shielding line; and a waveform of a second portion in each periodic part of the first light shielding line is the same as a waveform of a first portion in each periodic part of the second light shielding line.

In some embodiments, ends of the first segment, ends of the second segment, ends of the third segment, and ends of the fourth segment are overlapped with the first mesh structure in the direction perpendicular to the liquid crystal display panel; or intersections of the ends of the first segment, the ends of the second segment, the ends of the third segment, and the ends of the fourth segment with the first mesh structure overlap in a direction perpendicular to the liquid crystal display panel.

In some embodiments, each row of the subpixels comprises a plurality of pixel units, each of the plurality of pixel units comprises first subpixels, second subpixels and third subpixels that are different in color and arranged in sequence, and the color of the subpixels disposed in the same column is the same; and an area of the dimming pixel is not less than an area of the pixel unit.

In some embodiments, the first mesh structure comprises a plurality of first gate lines extending along the first direction, a plurality of first data lines extending along the second direction, and a light shielding matrix disposed on one side of the first gate lines and the first data lines away from the dimming liquid crystal panel, a line width of the first gate line and a line width of the first data line are less than a line width of the light shielding matrix, and the first gate line and the first data line are overlapped with the light shielding matrix in the direction perpendicular to the liquid crystal display panel.

In some embodiments, the second mesh structure comprises a plurality of second gate lines extending along a first direction and a plurality of second data lines extending along a second direction, the second gate line and the second data line are disposed on one side of the light shielding lines away from the liquid crystal display panel, and a line width of the second gate line is less than that a line width of the light shielding line, and the second gate line and the light shielding line are overlapped in the direction perpendicular to the liquid crystal display panel.

In some embodiments, the second data line extends in a broken line waveform.

Other features of the present disclosure and advantages thereof will become apparent from the following detailed description of embodiments of the disclosure with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which.

It should be understood that the dimensions of the various parts shown in the drawings are not drawn according to the actual proportional relationship. Further, the same or similar reference numerals denote the same or similar components.

DETAILED DESCRIPTION

Figure 1:
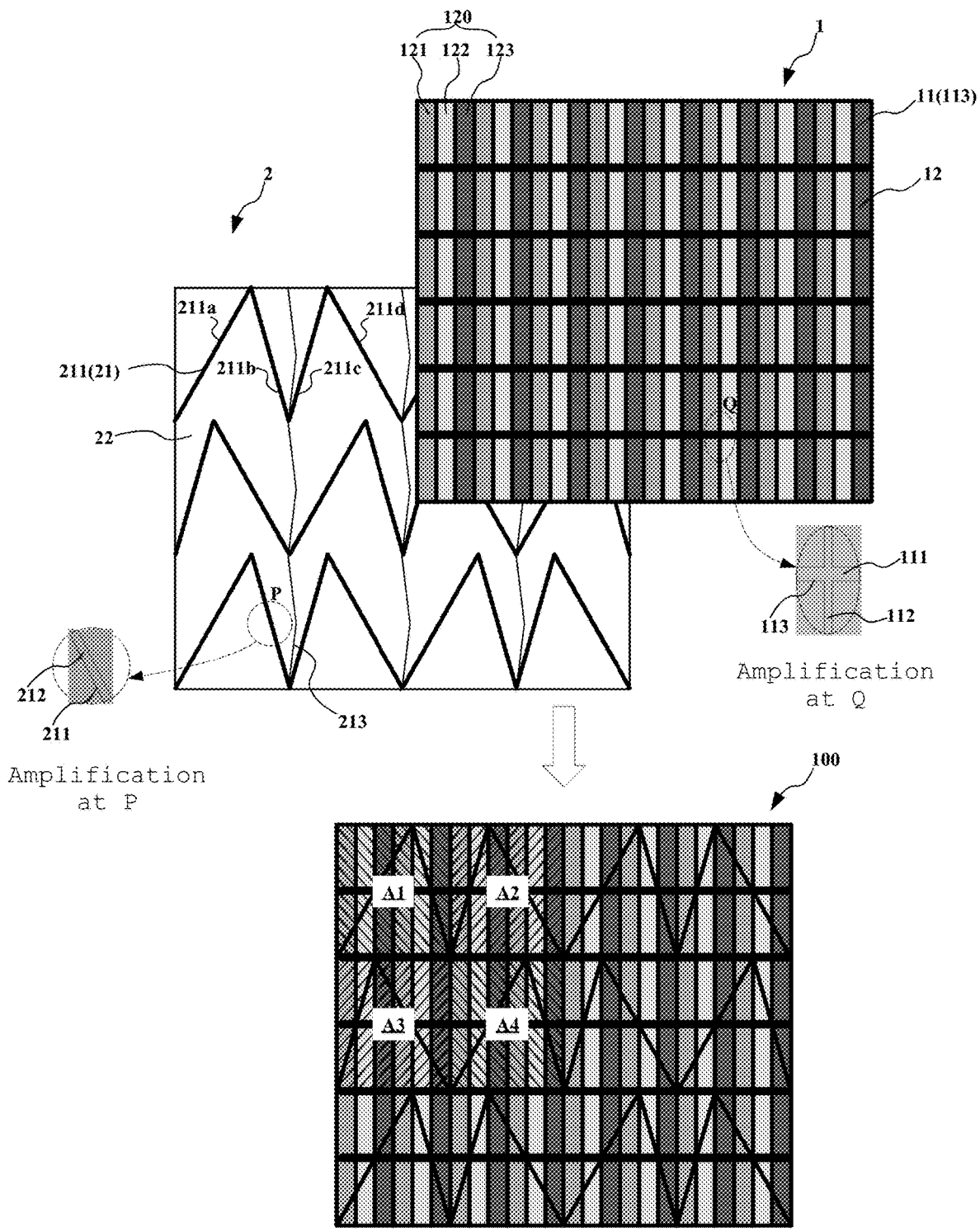
FIG. 1 is a schematic structural diagram of a display panel according to one embodiment of the present disclosure.

Various embodiments of the present disclosure will now be described in detail with reference to the accompanying drawings. The description of the embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that, unless otherwise specifically noted, the relative arrangement of parts and steps set forth in these embodiments is to be construed as illustrative only and not as limiting.

The use of "first", "second", and similar words in this disclosure is not intended to indicate any order, quantity, or importance, but rather is used to distinguish one element from another. The word "comprising", and similar words mean that the elements preceding the word encompass the elements listed after the word and do not exclude the possibility that other elements are also encompassed. "Upper", "lower", "left", "right", and the like are used only to indicate relative positional relationships, and when the absolute position of the object being described is changed, the relative positional relationships may also be changed accordingly.

In the present disclosure, when a specific element is described as being disposed between a first element and a second element, there may or may not be an intervening element between the specific element and the first element or the second element.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

Currently, a conventional type of display device in the market is a liquid crystal display (LCD) device. The conventional LCD device generally includes an LCD panel and a backlight module disposed at a light incident side of the LCD panel. The LCD panel includes: an array substrate and a filtering substrate oppositely arranged to form a liquid crystal box, a liquid crystal layer disposed between the array substrate and the filtering substrate, a first polarizer disposed on one side of the array substrate away from the filtering substrate, and a second polarizer disposed on one side of the filtering substrate away from the array substrate. The array substrate is closer to the backlight module relative to the filtering substrate, and a polarization direction of the first polarizer is orthogonal to a polarization direction of the second polarizer. The LCD panel includes a plurality of pixel units, each of the plurality of pixel units includes a plurality of subpixels having different colors. The subpixels of the same pixel unit mix light according to a certain proportion, so that the pixel unit can display colors visible to human eyes. The conventional liquid crystal display device has the technical defects of poor picture contrast and dark-state light leakage due to the structural features of the conventional liquid crystal display device.

In order to improve the above-mentioned drawbacks, the related art proposes a liquid crystal display device using a dual-screen driving technique, which mainly differs from the above-described conventional liquid crystal display device in that the display panel of the liquid crystal display device using a dual-screen driving technique includes a dimming liquid crystal panel and a liquid crystal display panel which are disposed in a stacked manner. The structure and the working principle of the liquid crystal display panel are similar to those of the liquid crystal display panel above. The dimming liquid crystal panel is disposed on the light incident side of the liquid crystal display panel and on the light outlet side of the backlight module, and comprises a plurality of dimming pixels which are arranged in an array. Each dimming pixel serves as a dimming unit for controlling the direction and intensity of the backlight emitted into the corresponding region of the liquid crystal display panel from the dimming pixel.

The liquid crystal display device in the related art can realize finer local dimming on a picture, and the principle is that the light transmission of the corresponding dimming pixel of the dimming liquid crystal panel is adjusted (i.e. the direction and/or intensity of the backlight to be allowed to penetrate) according to the gray scale of the displayed picture in different regions. For example, for an area with higher picture brightness, the light transmittance of the corresponding dimming pixel of the dimming liquid crystal panel is also adjusted to be relatively high; for the area with lower picture brightness, the light transmittance of the corresponding dimming pixel of the dimming liquid crystal panel is adjusted to be relatively lower; for the area where the picture is displayed as black, the light transmittance of the corresponding dimming pixel of the dimming liquid crystal panel is adjusted to be substantially zero. Compared with the conventional liquid crystal display device, the liquid crystal display device using a dual-screen driving technique can overcome the defect of light leakage in a dark state of a picture, and obviously improves the contrast ratio, thereby bringing better watching experience for a user. Particularly, when the liquid crystal display device performs HDR (High-Dynamic Range) display, the local dimming makes the brightness range of the picture wider, the low gray scale transition more natural, and the display effect better.

However, since the pixel sizes of the dimming liquid crystal panel and the liquid crystal display panel are in the same order of magnitude, and the spatial periods are relatively close to each other, the alternating light stripes and dark stripes, i.e., moiré stripes, are easily generated on the pictures formed by stacking the dimming liquid crystal panel and the liquid crystal display panel. The moiré stripes is an embodiment of the beat principle.

In order to eliminate the moiré stripes, another related art proposes to design the gate lines extending in the row direction of the dimming liquid crystal panel into a broken line waveform, and to shield the liquid crystal panel from one side close to the liquid crystal display panel by the light shielding lines with the same shape but larger line width. Because a mesh shape of the dimming liquid crystal panel and a mesh shape of the liquid crystal display panel are obviously different, human eyes cannot easily feel moiré stripes after lamination, and the purpose of eliminating the moiré stripes can be achieved.

In the research and development process of related products, the inventors of the present disclosure found that in the related art capable of eliminating the moiré stripes, color stripes, that is, rainbow stripes, can be seen on the display screen, which still affects the quality of the display screen, resulting in a reduction in the viewing experience of the user.

The embodiment of the disclosure provides a display panel and a display device, so as to eliminate rainbow patterns on a display device picture and improve the display quality of the display device.

As shown in FIG. 1, a display panel 100 provided in one embodiment of the present disclosure includes a dimming liquid crystal panel 2 and a liquid crystal display panel 1 which are stacked.

The liquid crystal display panel 1 includes a plurality of subpixels 12 defined by a first mesh structure 11 and arranged in an array.

The dimming liquid crystal panel 2 is disposed at a light incident side of the liquid crystal display panel 1 and includes a plurality of dimming pixels 22 defined by the second mesh structure 21 and arranged in an array.

The second mesh structure 21 includes a plurality of light shielding lines 211 extending along a first direction and having a waveform. Each of the light shielding lines 211 includes a plurality of periodic parts, each of which includes a first portion and a second portion which are symmetrical relative to a symmetry axis along a second direction perpendicular to the first direction. The first portion includes a first segment 211a and a second segment 211b which are connected with adjacent waveform valley points and waveform peak points of the light shielding line 211, and one end of the first segment 211a and one end of the second segment 211b are located at the same valley point or peak point, a projection length of the first segment 211a and a projection length of the second segment 211b in the first direction are different. The second portion includes a third segment 211c which is symmetrical with the second segment 211b relative to the above-mentioned symmetry axis and a fourth segment 211d which is symmetrical with the first segment 211a relative to the above-mentioned symmetry axis.

In some embodiments, the first direction is a row direction and the second direction is a column direction.

The structure and operation principle of the liquid crystal display panel 1 are similar to those of the aforementioned conventional technology and related technologies, and such description is not repeated. In the embodiment of the present disclosure, as shown in an enlarged view at Q of FIG. 1, the first mesh structure 11 includes: a plurality of first gate lines 111 extending along the first direction, a plurality of first data lines 112 extending along a second direction, and a light shielding matrix 113 disposed on one side of the first gate lines 111 and the first data lines 112 away from the dimming liquid crystal panel 2. A line width of the first gate line 111 and a line width of the first data line 112 are less than a line width of the light shielding matrix 113, and the first gate line 111 and the first data line 112 are overlapped with the light shielding matrix 113 in a direction perpendicular to the liquid crystal display panel 1. A line width of a gate line is generally greater than the line width of the data line, therefore the line width of the extending portion of the light shielding matrix 113 along the first direction is generally greater than the line width of the extending portion of the light shielding matrix 113 along the second direction.

It is to be understood that, in order to support the gray scale display of the subpixels 12, a first thin film transistor (not shown) corresponding to each subpixel 12 is further provided, and the first thin film transistor is disposed on the intersection of the first gate line 111 and the first data line 112. The first thin film transistor, the first gate line 111, and the first data line 112 are not visible as being shielded by the light shielding matrix 113, as viewed from the light emitting side of the liquid crystal display panel 1.

The dimming liquid crystal panel 2 uses the dimming pixels 22 as a control unit for implementing local dimming of a picture. As shown in FIG. 1, the dimming pixels 22 of the dimming liquid crystal panel 2 are defined by the second mesh structure 21. As shown in an enlarged view at P of FIG. 1, the second mesh structure 21 includes a plurality of second gate lines 212 extending along the first direction and a plurality of second data lines 213 extending along the second direction, in addition to the light shielding lines 211. The second gate line 212 and the second data line 213 are disposed on one side of the light shielding line 211 away from the liquid crystal display panel 1. The second gate line 212 and the light shielding line 211 have substantially the same shape, a line width of the second gate line 212 is less than a line width of the light shielding line 211, and the second gate line 212 and the light shielding line 211 are overlapped in a direction perpendicular to the liquid crystal display panel 1. The second gate lines 212 is invisible from the light exit side of the dimming liquid crystal panel 2 because it is shielded by the light shielding line 211. In addition, the line width of the second data line 213 is much less than the line width of the second gate line 212, and light leakage between adjacent dimming pixels is hardly caused, so that the second data line 213 does not need to be shielded in the dimming liquid crystal panel 2. The second data line 213 may extend in a linear shape or in a broken line waveform as shown in FIG. 1. The second data line 213 is designed to extend in a broken line waveform, so that the difference between the first mesh structure 11 and the second mesh structure 21 can be more obvious, and the moiré strips can be more favorably eliminated.

The main layer structure of the dimming liquid crystal panel 2 includes an array substrate and an opposite substrate that are oppositely disposed to form a liquid crystal cell, and a liquid crystal layer between the array substrate and the opposite substrate. The opposite substrate is closer to the liquid crystal display panel relative to the array substrate. The liquid crystal cell structure of the dimming liquid crystal panel 2 is similar to that of the liquid crystal display panel 1, but filter layer is not needed to be arranged on the dimming liquid crystal panel 2. The second gate line 212 and the second data line 213 are disposed on the array substrate. In order to control the dimming pixels 22, a second thin film transistor (not shown) is disposed corresponding to each dimming pixel 22, and the second thin film transistor is disposed at an intersection of the second gate lines 212 and the second data lines 213. The light shielding lines 211 can be disposed on the opposite substrate.

The specific shape of the light shielding lines 211 of the dimming liquid crystal panel 2 is not limited. For example, the light shielding lines 211 extend in a curvilinear waveform or a broken line waveform as shown in the FIG. 1, the effect of eliminating the moiré strips can be achieved.

Figure 3:
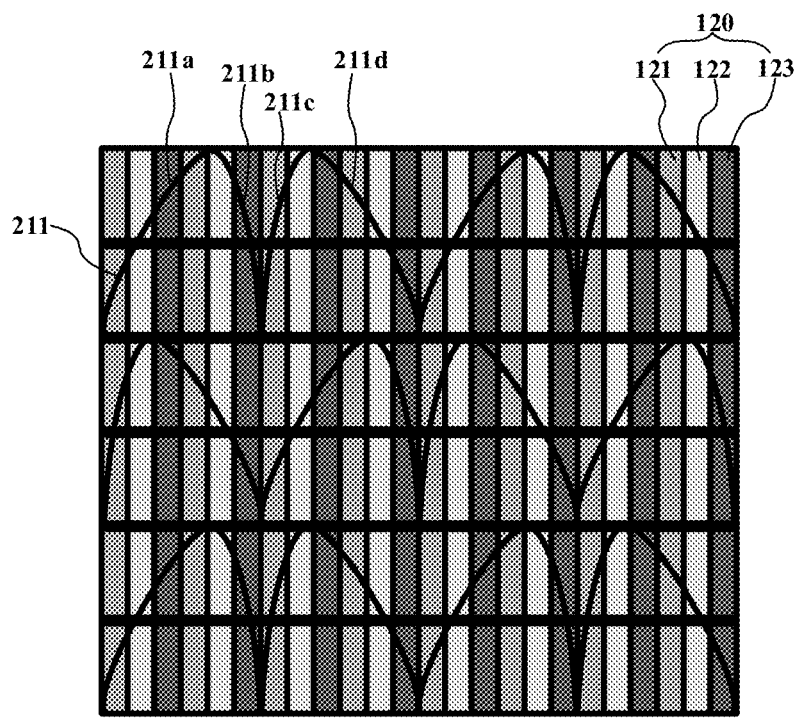
FIG. 3 is a partial front view of a display panel according to another embodiment of the present disclosure.

According to the principle that the straight line between two points is the shortest, in the embodiment shown in FIG. 1, in order to reduce an overlapping area of the light shielding lines 211 and the subpixels 12 as much as possible and to increase the aperture ratio of the subpixels 12, the light shielding lines 211 is designed to extend in a broken line waveform, and the first segment 211a, the second segment 211b, the third segment 211c, and the fourth segment 211d are all straight line segments. The broken line shape of the light shielding lines is not limited to that shown in FIG. 1, and may also be in other forms. For example, as shown in FIG. 3, in some embodiments, the first segment 211a, the second segment 211b, the third segment 211c, and the fourth segment 211d may also be arc line segments. In other embodiments, the broken line shape of the light shielding lines may also be in a shape that the first segment is an arc line segment, the second segment is a straight line segment, the third segment is a straight line segment, and the fourth segment is an arc line segment. The shape of the light shielding lines is not listed here.

In the embodiment of the present disclosure, the projection length of the first segment 211a and the projection length of the second segment 211b in the first direction are not equal. Since the third segment 211c and the second segment 211b are symmetrical with respect to the symmetry axis, and the fourth segment 211d and the first segment 211a are symmetrical with respect to the symmetry axis, the projection length of the third segment 211c and the projection length of the fourth segment 211d in the first direction are also different. As shown in FIG. 1, the projection length of the first segment 211a in the first direction is approximately 4 subpixels in width, and the projection length of the second segment 211b in the first direction is approximately 2 subpixels in width. Accordingly, the projection length of the third segment 211c in the first direction is approximately 2 subpixels in width, and the projection length of the fourth segment 211d in the first direction is approximately 4 subpixels in width.

Figure 4:
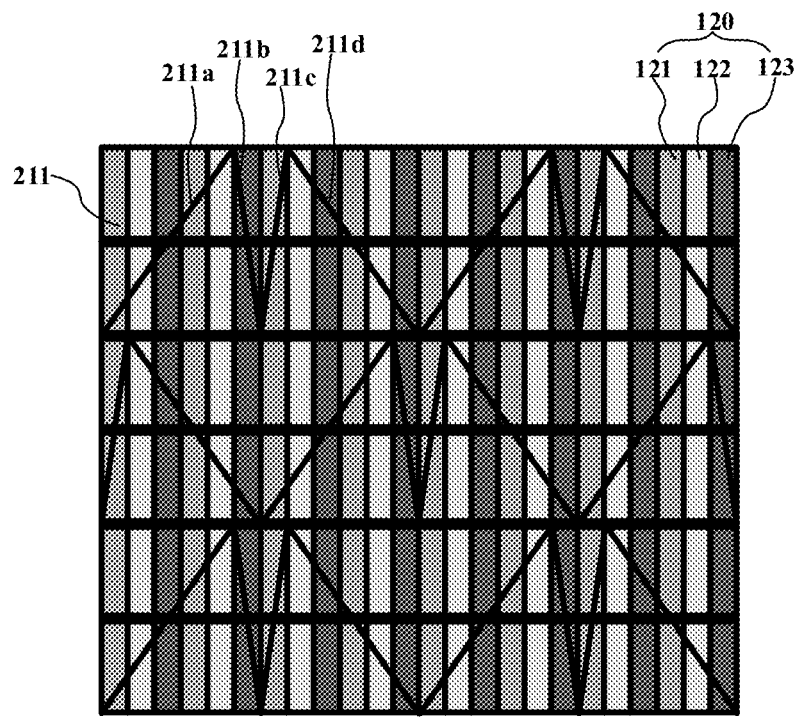
FIG. 4 is a partial front view of a display panel according to still another embodiment of the present disclosure.

In other embodiments of the disclosure, the projection length of the first portion and the projection length of the second portion in the first direction can be designed into other proportions according to requirements. For example, as shown in FIG. 4, the projection length of the first segment 211a in the first direction is approximately 5 subpixels in width, the projection length of the second segment 211b in the first direction is approximately 1 subpixels in width, correspondingly, the projection length of the third segment 211c in the first direction is approximately 1 subpixels in width, and the projection length of the fourth segment 211d in the first direction is approximately 5 subpixels in width.

In some embodiments of the present disclosure, ends of the first segment 211a, ends of the second segment 211b, ends of the third segment 211c, and ends of the fourth segment 211d of the light shielding lines 211 overlap the first mesh structure 11 in a direction perpendicular to the liquid crystal display panel 1, respectively. In order to facilitate the design of the second data lines 213 and achieve a better effect of eliminating the Moiré strips, intersections of the ends of the first segment 211a, the ends of the second segment 211b, the ends of the third segment 211c, and the ends of the fourth segment 211d overlap with the first mesh structure 11 in the direction perpendicular to the liquid crystal display panel 1.

As shown in FIG. 1, each row of subpixels 12 of the liquid crystal display panel 1 includes a plurality of pixel units 120, each pixel unit 120 includes first subpixels 121, second subpixels 122, and third subpixels 123, which are different in color and arranged in sequence, and the color of the subpixels disposed in the same column is the same. The resolution of the dimming pixels 22 may be designed according to the requirement for precision of local dimming. In the embodiment of the present disclosure, the area of the dimming pixel 22 is not less than the area of the pixel unit 120. In some embodiments, an area of the dimming pixel is approximately four times of the area of the pixel unit. In other embodiments, the area of the dimmed pixel is approximately 16 times of the area of the pixel unit. In still other embodiments, the area of the dimming pixel is approximately 1.5 times of the area of the pixel unit. The area ratio of the dimming pixel to the pixel unit can be designed to be other values, which are not listed here. In view of the specific structure and manufacturing tolerances of the first mesh structure 11 and the second mesh structure 21, the term "substantially" should be understood to be within a certain tolerance in the present disclosure.

Figure 2A:
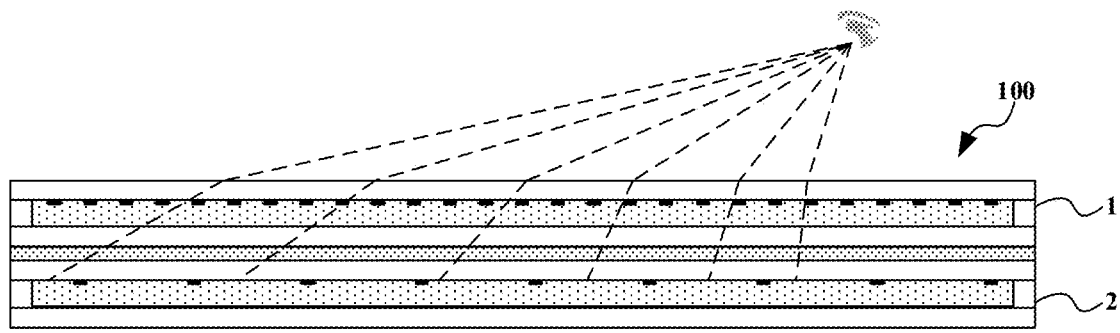
FIG. 2a is a schematic diagram illustrating visual dislocation occurred when viewing a display panel by human eyes at different viewing angles.

As shown in FIG. 2a, since the human eye resembles a light receiver, the viewing angles of different areas of the picture are different. When human eyes watch the display panel 100, because a stacked structure of the dimming liquid crystal panel 1 and the liquid crystal display panel 2 has a certain thickness, and refractive indexes of different materials are different, such that a pixel pattern of the dimming liquid crystal panel 1 and a pixel pattern of the liquid crystal display panel 2 are visual dislocated at different viewing angles, The greater a difference in the viewing angles, the more obvious the visual dislocation is.

Figure 2B:
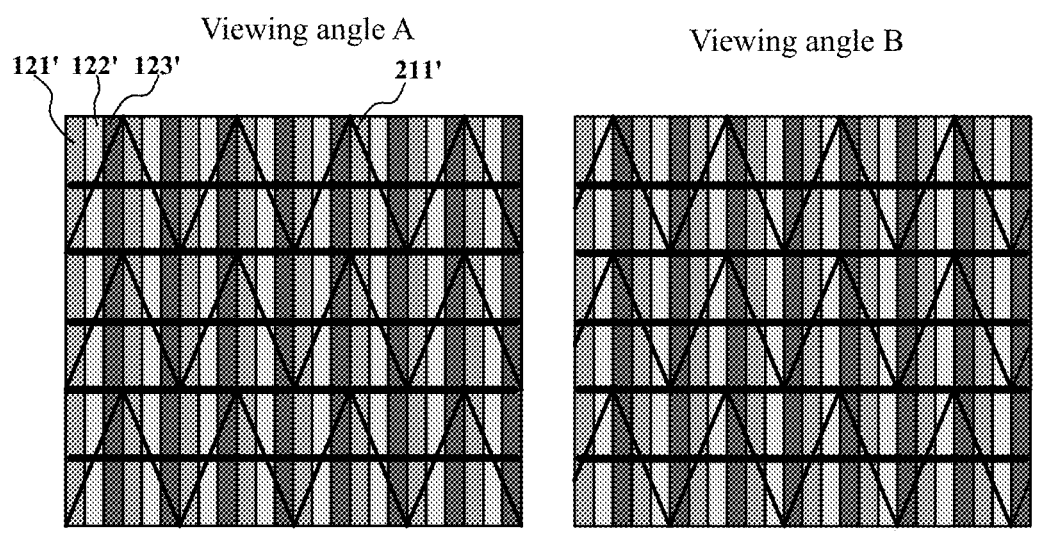
FIG. 2b is a comparison diagram of a display image of a related art viewed from a viewing angle A and a viewing angle B by human eyes in a corresponding area.

FIG. 2b is a comparison diagram of a display image of a related art viewed from a viewing angle A and a viewing angle B by human eyes in a corresponding area. In the related art, the phases of the adjacent light shielding lines 211' are the same, that is, the peaks of the adjacent light-shielding lines 211' are disposed on the same column-direction line, and the valleys are disposed on the same column-direction line. Considering the difference between the line width of the row-direction extending portion and the line width of the column-direction extending portion of the light shielding matrix of the liquid crystal display panel, as can be seen from FIG. 2b, at the viewing angle A, an overlap area of the light shielding lines 211' with the red first subpixels 121' and the blue third subpixels 123' perceived by the human eye in the corresponding area is larger, and an overlap area of the light shielding lines 211' with the green second subpixels 122' is relatively smaller, so that the overall color of this area is greenish in human eyes. At the viewing angle B, due to the existence of visual dislocation, the light shielding lines 211' perceived by the human eye in the corresponding area deviates to the left by about one subpixel width, so that the overlap area of the light shielding lines 211' with the blue third subpixels 123' and the green second subpixels 122' perceived by the human eyes is larger, and the overlap area of the light shielding lines 211' with the red first subpixels 121' is relatively smaller, and thus the region has a reddish color in the human eye as a whole. When the human eye looks at the two parts of the area at the same time, it can clearly feel the fluctuation of the color temperature in the two parts of the area, thereby feeling the rainbow pattern.

In the embodiment of the present disclosure, one periodic part of the light shielding line includes a first portion and a second portion that are symmetrical relative to a symmetry axis along the second direction perpendicular to the first direction, and each of the first portion and the second portion includes two segments having unequal projection lengths in the first direction. In this way, the overlapping area of the first portion with the first subpixels, the second subpixels and the third subpixels can be mutually compensated with the overlapping area of the second portion with the first subpixels, the second subpixels and the third subpixels, so that the overlapping areas of the light shielding lines with the subpixels having different colors in a certain area are basically averaged on the whole, and the color temperature of the display panel in different areas is basically consistent. Although the visual dislocation still exists at different visual angles, the human eyes cannot feel obvious fluctuation of the color temperature. Therefore the rainbow patterns are effectively improved.

In some embodiments, in any two adjacent light shielding lines, the waveform of the first portion in each periodic part of one light shielding line is the same as the waveform of the second portion in each periodic part of the adjacent second light shielding line. The waveform of the second portion in each periodic part of the first light shielding line is the same as the waveform of the first portion in each periodic part of the second light shielding line. As shown in FIG. 1, in the first light shielding line at the top in the dimming liquid crystal panel 2, each periodic part includes a first portion (i.e., the first segment 211a and the second segment 211b) and a second portion (i.e., the third segment 211c and the fourth segment 211d). In the second light shielding line adjacent to the first light shielding line, each periodic part includes a first portion (i.e., the third segment 211c and the fourth segment 211d) and a second portion (i.e., the first segment 211a and the second segment 211b). That is, the waveform phase difference $\Delta\Phi=\pi$ between any adjacent two light shielding lines 211. As shown in FIG. 1, in the region A1, the overlapping area of the light shielding lines 211 with the second subpixels 122 and the third subpixels 123 is larger, while the overlapping area of the light shielding lines 211 with the first subpixels 121 is small. In the region A2, the light shielding lines 211 have a larger overlapping area with the first subpixels 121 and the second subpixels 122, and have a smaller overlapping area with the third subpixels 123. In the region A3, the light shielding lines 211 have a large overlapping area with the first subpixels 121 and the second subpixels 122, and have a small overlapping area with the third subpixels 123; in the region A4, the light shielding lines 211 have a large overlapping area with the second subpixels 122 and the third subpixels 123 and a small overlapping area with the first subpixels 121.

In region A1 and region A2, the overlapping areas of the light shielding lines 211 with the first subpixels 121, the second subpixels 122, and the third subpixels 123 can be compensated for each other. Similarly, in region A3 and region A4, the overlapping areas of the light shielding lines 211 with the first subpixels 121, the second subpixels 122, and the third subpixels 123 can be compensated for each other. In region A1 and region A3, the overlapping areas of the light shielding lines 211 with each of the first subpixels 121, the second subpixels 122, and the third subpixels 123 can be compensated for each other. In region A2 and region A4, the overlapping areas of the light shielding lines 211 with the first subpixels 121, the second subpixels 122, and the third subpixels 123 can be compensated for each other. As to the entire regions A1, A2, A3, and A4, the overlapping areas of the light shielding lines 211 with the first subpixels 121, the second subpixels 122, and the third subpixels 123 are substantially averaged, the improvement effect on the rainbow patterns is better.

Figure 5:
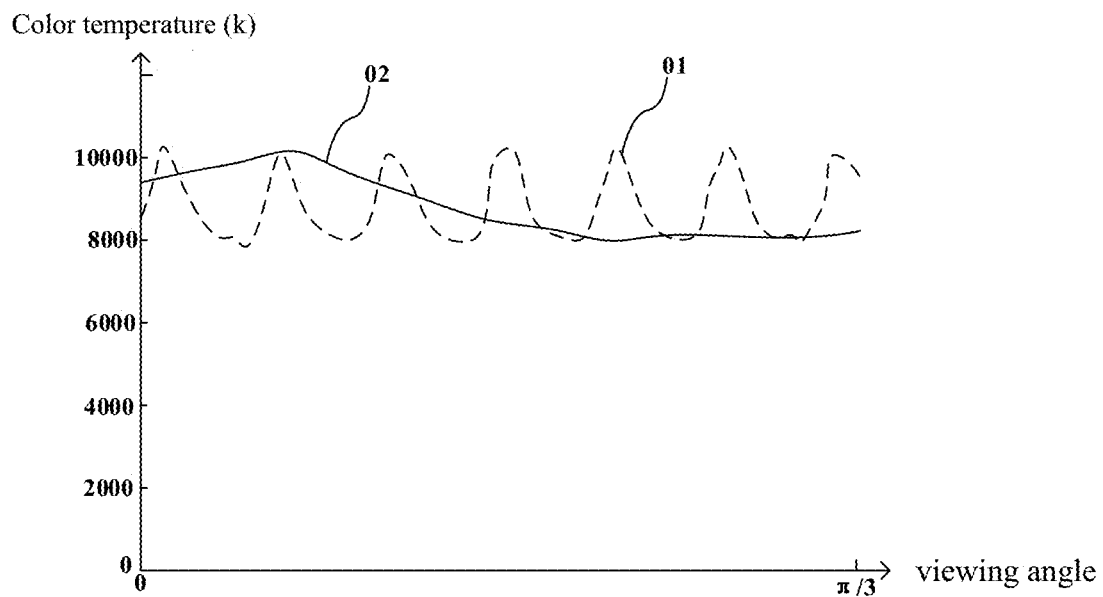
FIG. 5 is a comparison graph of color temperature simulation curves of a display panel according to an embodiment of the present disclosure and a display panel of a related art.

The inventors of the present application performed color temperature simulations on 65-inch display panel products using both the structures of FIG. 1 and FIG. 2b, respectively, and the comparison results are shown in FIG. 5. In FIG. 5, a curve 01 is a color temperature simulation curve of the related art shown in FIG. 2b, and a curve 02 is a color temperature simulation curve of the embodiment shown in FIG. 1 of the present disclosure. It can be seen that, with the change of the viewing angle of human eyes, the fluctuation of the color temperature curve of the display panel in the related art is obvious, and the fluctuation range of the color temperature is about 3000 k, whereas the color temperature curve of the display panel in the embodiment of the present disclosure is smoother, and the fluctuation range of the color temperature is about 800 k. The fluctuation condition of the color temperature of the picture can directly reflect the presenting condition of the rainbow patterns, and compared with the related technology, the fluctuation range of the color temperature of the display panel in the embodiment of the present disclosure is smaller, human eyes hardly feel the rainbow patterns, therefore the quality of the displayed picture is obviously improved.

Figure 6A:
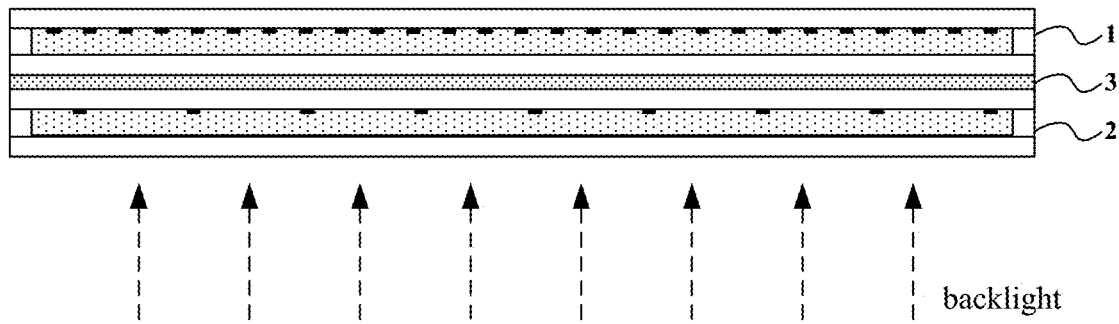
FIG. 6a is a schematic cross-sectional view of a display panel according to one embodiment of the present disclosure.
Figure 6B:
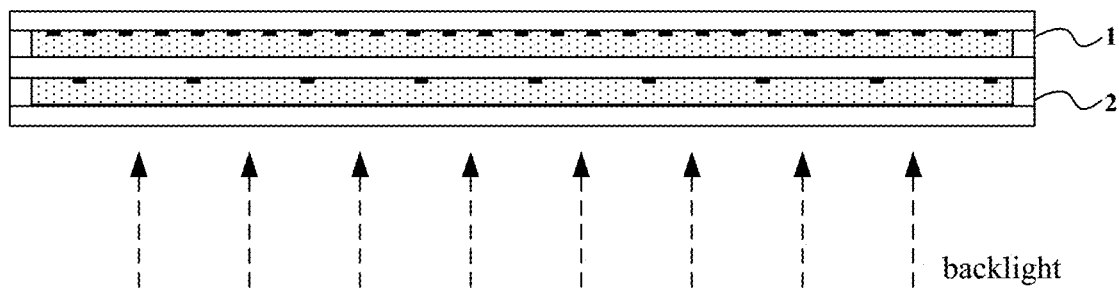
FIG. 6b is a schematic cross-sectional view of a display panel according to another embodiment of the disclosure.

In one embodiment of the present disclosure, as shown in FIG. 6a, the dimming liquid crystal panel 2 and the liquid crystal display panel 1 are adhered by the optically clear adhesive 3, the manufacturing process is simple and easy to maintain. In other embodiments, as shown in FIG. 6b, the dimming liquid crystal panel and the liquid crystal display panel 1 share the same manufacturing substrate on one side close to each other, thereby being helpful for reducing the thickness of the display panel and reducing the manufacturing cost.

The embodiment of the disclosure further provides a display device, which includes the display panel of any one of the foregoing embodiments. The display device can realize the fine local dimming of a picture, get excellent contrast performance, and eliminate the moiré strips and the rainbow patterns of the picture effectively, so that the picture quality is higher, thereby remarkably improving the user experience. The specific product type of the display device is not limited, and may be, for example, a display, a tablet computer, a notebook computer, a television, an Automatic Teller Machine (ATM) apparatus, an electronic paper, a display screen, and the like.

Although some specific embodiments of the present disclosure have been described in detail by way of example, it should be understood by those skilled in the art that the above examples are for illustration only and are not intended to limit the scope of the present disclosure. It will be appreciated by those skilled in the art that modifications can be made to the above embodiments without departing from the scope and spirit of the present disclosure. The scope of the present disclosure is defined by the appended claims.

What is claimed is:

1. A display panel, comprising:
a liquid crystal display panel comprising a plurality of subpixels defined by a first mesh structure and arranged in an array; and
a dimming liquid crystal panel disposed on a light incident side of the liquid crystal display panel and stacked with the liquid crystal display panel, wherein the dimming liquid crystal panel comprises a plurality of dimming pixels defined by a second mesh structure and arranged in an array,
wherein the second mesh structure comprises a plurality of light shielding lines extending along a first direction and having a waveform, each light shielding line of the plurality of light shielding lines comprises a plurality of periodic parts, each periodic part of the plurality of periodic parts comprises a first portion and a second portion which are symmetrical relative to a symmetry axis along a second direction perpendicular to the first direction, the first portion comprises a first segment and a second segment which are connected with adjacent waveform valley points and waveform peak points of the light shielding line, and one end of the first segment and one end of the second segment are located at the same valley point or peak point, a projection length of the first segment and a projection length of the second segment in the first direction are different, and the second portion comprises a third segment which is symmetrical with the second segment relative to the symmetry axis and a fourth segment which is symmetrical with the first segment relative to the symmetry axis,
wherein the first mesh structure comprises a plurality of first gate lines extending along the first direction, a plurality of first data lines extending along the second direction and a light shielding matrix disposed on one side of the first gate lines and the first data lines away from the dimming liquid crystal panel, a line width of the first gate line and a line width of the first data line are less than a line width of the light shielding matrix, and the first gate line and the first data line are overlapped with the light shielding matrix in the direction perpendicular to the liquid crystal display panel.

2. The display panel according to claim 1, wherein the waveform includes a curvilinear waveform or a broken line waveform.

3. The display panel according to claim 1, wherein:
the waveform is a broken line waveform; and
the first segment is a straight line segment or an arc line segment, and the second segment is a straight line segment or an arc line segment.

4. The display panel according to claim 1, wherein:
a waveform of a first portion in each periodic part of a first light shielding line is the same as a waveform of a second portion in each periodic part of an adjacent second light shielding line; and
a waveform of a second portion in each periodic part of the first light shielding line is the same as a waveform of a first portion in each periodic part of the second light shielding line.

5. The display panel according to claim 4, wherein:
ends of the first segment, ends of the second segment, ends of the third segment, and ends of the fourth segment are overlapped with the first mesh structure in the direction perpendicular to the liquid crystal display panel; or
intersections of the ends of the first segment, the ends of the second segment, the ends of the third segment, and the ends of the fourth segment with the first mesh structure overlap in a direction perpendicular to the liquid crystal display panel.

6. The display panel according to claim 5, wherein:
each row of the subpixels comprises a plurality of pixel units, each of the plurality of pixel units comprises first subpixels, second subpixels and third subpixels that are different in color and arranged in sequence, and the color of the subpixels disposed in the same column is the same; and
an area of the dimming pixel is not less than an area of the pixel unit.

7. The display panel according to claim 6, wherein:
the area of the dimming pixel is approximately 4 times of the area of the pixel unit;
an orthographic projection of the first segment on the liquid crystal display panel substantially coincide with a diagonal line of a region where 4×2 subpixels are located, and an orthographic projection of the second segment on the liquid crystal display panel substantially coincide with a diagonal line of an region where 2×2 subpixels are located.

8. The display panel according to claim 1, wherein the second mesh structure comprises:
a plurality of second gate lines extending along a first direction; and
a plurality of second data lines extending along a second direction,
wherein the second gate line and the second data line are disposed on one side of the light shielding lines away from the liquid crystal display panel, and a line width of the second gate line is less than that a line width of the light shielding line, and the second gate line and the light shielding line are overlapped in the direction perpendicular to the liquid crystal display panel.

9. The display panel according to claim 8, wherein the second data line extends in a broken line waveform.

10. The display panel according to claim 1, wherein:
the dimming liquid crystal panel and the liquid crystal display panel are bonded by an optically clear adhesive; or
the dimming liquid crystal panel and the liquid crystal display panel share the same manufacturing substrate on one side close to each other.

11. A display device comprising a display panel, the display panel comprising:
a liquid crystal display panel comprising a plurality of subpixels defined by a first mesh structure and arranged in an array; and
a dimming liquid crystal panel disposed on a light incident side of the liquid crystal display panel and stacked with the liquid crystal display panel, wherein the dimming liquid crystal panel comprises a plurality of dimming pixels defined by a second mesh structure and arranged in an array,
wherein the second mesh structure comprises a plurality of light shielding lines extending along a first direction and having a waveform, each light shielding line of the plurality of light shielding lines comprises a plurality of periodic parts, each periodic part of the plurality of periodic parts comprises a first portion and a second portion which are symmetrical relative to a symmetry axis along a second direction perpendicular to the first direction, the first portion comprises a first segment and a second segment which are connected with adjacent waveform valley points and waveform peak points of the light shielding line, and one end of the first segment and one end of the second segment are located at the same valley point or peak point, a projection length of the first segment and a projection length of the second segment in the first direction are different, and the second portion comprises a third segment which is symmetrical with the second segment relative to the symmetry axis and a fourth segment which is symmetrical with the first segment relative to the symmetry axis,
wherein the first mesh structure comprises a plurality of first gate lines extending along the first direction, a plurality of first data lines extending along the second direction and a light shielding matrix disposed on one side of the first gate lines and the first data lines away from the dimming liquid crystal panel, a line width of the first gate line and a line width of the first data line are less than a line width of the light shielding matrix, and the first gate line and the first data line are overlapped with the light shielding matrix in the direction perpendicular to the liquid crystal display panel.

12. The display device according to claim 11, wherein the waveform includes a curvilinear waveform or a broken line waveform.

13. The display device according to claim 11, wherein:
the waveform is a broken line waveform; and
the first segment is a straight line segment or an arc line segment, and the second segment is a straight line segment or an arc line segment.

14. The display device according to claim 11, wherein:
a waveform of a first portion in each periodic part of a first light shielding line is the same as a waveform of a second portion in each periodic part of an adjacent second light shielding line; and
a waveform of a second portion in each periodic part of the first light shielding line is the same as a waveform of a first portion in each periodic part of the second light shielding line.

15. The display device according to claim 14, wherein:
ends of the first segment, ends of the second segment, ends of the third segment, and ends of the fourth segment are overlapped with the first mesh structure in the direction perpendicular to the liquid crystal display panel; or
intersections of the ends of the first segment, the ends of the second segment, the ends of the third segment, and the ends of the fourth segment with the first mesh structure overlap in a direction perpendicular to the liquid crystal display panel.

16. The display device according to claim 15, wherein:

each row of the subpixels comprises a plurality of pixel units, each of the plurality of pixel units comprises first subpixels, second subpixels and third subpixels that are different in color and arranged in sequence, and the color of the subpixels disposed in the same column is the same; and an area of the dimming pixel is not less than an area of the pixel unit.

17. The display device according to claim 11, wherein the second mesh structure comprises a plurality of second gate lines extending along a first direction; and a plurality of second data lines extending along a second direction, wherein the second gate line and the second data line are disposed on one side of the light shielding lines away from the liquid crystal display panel, and a line width of the second gate line is less than that a line width of the light shielding line, and the second gate line and the light shielding line are overlapped in the direction perpendicular to the liquid crystal display panel.

18. The display device according to claim 17, wherein the second data line extends in a broken line waveform.

* * * * *